United States Patent
Byun et al.

(10) Patent No.: US 10,498,487 B2
(45) Date of Patent: Dec. 3, 2019

(54) METHOD AND DEVICE FOR TRANSMITTING CONTROL INFORMATION IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,877

(22) PCT Filed: Dec. 9, 2015

(86) PCT No.: PCT/KR2015/013417
§ 371 (c)(1),
(2) Date: Jan. 8, 2018

(87) PCT Pub. No.: WO2017/010634
PCT Pub. Date: Jan. 19, 2017

(65) Prior Publication Data
US 2018/0375613 A1    Dec. 27, 2018

Related U.S. Application Data

(60) Provisional application No. 62/190,755, filed on Jul. 10, 2015.

(51) Int. Cl.
*H04L 1/00* (2006.01)
*H04W 72/12* (2009.01)
(Continued)

(52) U.S. Cl.
CPC .............. *H04L 1/0061* (2013.01); *H04L 1/00* (2013.01); *H04L 1/0038* (2013.01);
(Continued)

(58) Field of Classification Search
CPC ....... H04L 1/0061; H04L 1/00; H04L 1/0038; H04L 5/005; H04L 5/0053;
(Continued)

(56) References Cited

U.S. PATENT DOCUMENTS

| 2010/0088580 A1* | 4/2010 | Chun | ................. H04L 1/04 714/807 |
| 2012/0252447 A1* | 10/2012 | Sartori | ............... H04W 48/12 455/434 |

(Continued)

FOREIGN PATENT DOCUMENTS

| WO | 2011145884 | 11/2011 |
| WO | 2013112017 | 8/2013 |
| WO | 2014146616 | 9/2014 |

OTHER PUBLICATIONS

PCT International Application No. PCT/KR2015/013417, International Search Report dated May 9, 2016, 4 pages.

*Primary Examiner* — Kodzovi Acolatse
*Assistant Examiner* — Jay L Vogel
(74) *Attorney, Agent, or Firm* — Lee Hong Degerman Kang Waimey

(57) ABSTRACT

Provided are a method and device for transmitting control information in a wireless communication system. In particular, a base station transmits, to a terminal, an RNTI mapped to a downlink terminal group or an uplink terminal group including a terminal, and a terminal ID instructing the terminal in the downlink terminal group or the uplink terminal group. The RNTI and the terminal ID are used to set control information, and the control information includes an identification information field instructing whether scheduling information on the terminal exists, a scheduling information field for the terminals in each terminal group, and a first CRC field. The first CRC field is encoded for the scheduling information field for the terminals in each ter- (Continued)

minal group. The set control information is transmitted to the terminal.

12 Claims, 17 Drawing Sheets

(51) Int. Cl.
 H04L 5/00 (2006.01)
 H04W 72/14 (2009.01)
 H04W 72/04 (2009.01)
 H04L 1/16 (2006.01)
(52) U.S. Cl.
 CPC ............ *H04L 1/0072* (2013.01); *H04L 5/005* (2013.01); *H04L 5/0053* (2013.01); *H04W 72/0406* (2013.01); *H04W 72/0446* (2013.01); *H04W 72/1278* (2013.01); *H04W 72/1289* (2013.01); *H04W 72/14* (2013.01); *H04L 1/1607* (2013.01); *H04W 72/121* (2013.01)
(58) Field of Classification Search
 CPC ......... H04W 72/0406; H04W 72/0446; H04W 72/1278; H04W 72/14
 See application file for complete search history.

(56) References Cited

U.S. PATENT DOCUMENTS

| 2013/0003692 | A1* | 1/2013 | Nishio | H04L 5/001 370/329 |
| 2013/0114533 | A1* | 5/2013 | Ji | H04W 72/1263 370/329 |
| 2013/0150109 | A1 | 6/2013 | Takano | |
| 2013/0286918 | A1 | 10/2013 | Park et al. | |
| 2013/0322378 | A1* | 12/2013 | Guan | H04W 72/1289 370/329 |

* cited by examiner

$(D_4, 0) \rightarrow C_1$
$(D_4, U_1) \rightarrow C_2$
$(D_4, U_2) \rightarrow C_3$
$(D_4, U_3) \rightarrow C_4$
$(D_5, 0) \rightarrow C_5$
$(D_5, U_1) \rightarrow C_6$
$(D_5, U_2) \rightarrow C_7$
$(D_5, U_3) \rightarrow C_8$
$(D_6, 0) \rightarrow C_9$
$(D_6, U_1) \rightarrow C_{10}$
$(D_6, U_2) \rightarrow C_{11}$
$(D_6, U_3) \rightarrow C_{12}$
$(0, U_1) \rightarrow C_{13}$
$(0, U_2) \rightarrow C_{14}$
$(0, U_3) \rightarrow C_{15}$ $|Dm| = 2, \ |Un| = 1$ CASE #1: assume that BS provide
 DL grant for $UE_1$ and $UE_2$ DCI format configured by BS
$\rightarrow UE_1$ DL grant + $UE_2$ DL grant +
 zero padding + $C_1$ (CRC masking)

FIG. 13

~~$D_1 = \{UE_1\}$~~
~~$D_2 = \{UE_2\}$~~
~~$D_3 = \{UE_3\}$~~
$D_4 = \{UE_1, UE_2\}$
$D_5 = \{UE_1, UE_3\}$
$D_6 = \{UE_2, UE_3\}$
~~$D_7 = \{UE_1, UE_2, UE_3\}$~~
$U_1 = \{UE_1\}$
$U_2 = \{UE_2\}$
grant(Null)
$U_3 = \{UE_3\}$
~~$U_4 = \{UE_1, UE_2\}$~~
~~$U_5 = \{UE_1, UE_3\}$~~
~~$D_6 = \{UE_2, UE_3\}$~~
~~$D_7 = \{UE_1, UE_2, UE_3\}$~~

$(D_4, 0) \rightarrow C_1$
$(D_4, U_1) \rightarrow C_2$
$(D_4, U_2) \rightarrow C_3$
$(D_4, U_3) \rightarrow C_4$
$(D_5, 0) \rightarrow C_5$
$(D_5, U_1) \rightarrow C_6$
$(D_5, U_2) \rightarrow C_7$
$(D_5, U_3) \rightarrow C_8$
$(D_6, 0) \rightarrow C_9$
$(D_6, U_1) \rightarrow C_{10}$
$(D_6, U_2) \rightarrow C_{11}$
$(D_6, U_3) \rightarrow C_{12}$
$(0, U_1) \rightarrow C_{13}$
$(0, U_2) \rightarrow C_{14}$
$(0, U_3) \rightarrow C_{15}$ $|Dm| = 2, \quad |Un| = 1$ CASE #2: assume that BS provides
  DL grant for $UE_1$ DCI format configured by BS
$\rightarrow UE_1$ DL grant + $UE_2$ DL grant(Null) +
  zero padding + $C_1$(CRC masking)
  $\rightarrow$ (or) $UE_1$ DL grant + $UE_3$ DL grant(Null)
  +zero padding + $C_5$(CRC masking)

$(D_4, 0) \rightarrow C_1$
$(D_4, U_1) \rightarrow C_2$
$(D_4, U_2) \rightarrow C_3$
$(D_4, U_3) \rightarrow C_4$
$(D_5, 0) \rightarrow C_5$
$(D_5, U_1) \rightarrow C_6$
$(D_5, U_2) \rightarrow C_7$
$(D_5, U_3) \rightarrow C_8$
$(D_6, 0) \rightarrow C_9$
$(D_6, U_1) \rightarrow C_{10}$
$(D_6, U_2) \rightarrow C_{11}$
$(D_6, U_3) \rightarrow C_{12}$
$(0, U_1) \rightarrow C_{13}$
$(0, U_2) \rightarrow C_{14}$
$(0, U_3) \rightarrow C_{15}$ $|Dm| = 2, \ |Un| = 1$ CASE #3: assume that BS provides
    DL grant for $UE_1$, $UE_2$, and $UE_3$ CI format for $UE_1$ and $UE_2$ configured by BS
$\rightarrow UE_1$ DL grant + $UE_2$ DL grant +
    zero padding + $C_1$(CRC masking)

DCI format for $UE_3$ configured by BS
$\rightarrow UE_1$ DL grant(Null) + $UE_3$ DL grant +
    zero padding + $C_5$(CRC masking)
$\rightarrow$(or) $UE_2$ DL grant(Null) + $UE_3$ DL grant +
    zero padding + $C_9$(CRC masking)

METHOD AND DEVICE FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/013417, filed on Dec. 9, 2015, which claims the benefit of U.S. Provisional Application No. 62/190,755, filed on Jul. 10, 2015, the contents of which are all hereby incorporated by reference herein in their entirety.

BACKGROUND OF THE INVENTION

Field of the Invention

The present specification relates to wireless communication, and more particularly, to a method of transmitting control information in a wireless communication system, and a device using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present specification provides a method of transmitting control information in a wireless communication system, and a device using the method. In addition, the present specification provides a method of decoding control information in a wireless communication system, and a device using the method.

The present specification proposes a method of transmitting control information by a base station in a wireless communication system.

First, terminologies are summarized. Control information corresponds to a DCI format of a PDCCH or a sPDCCH, and scheduling information is included in the control information. An RNTI corresponds to a C-RNTI. Encoding corresponds to a coding process, and decoding corresponds to a decoding process. A downlink user equipment (UE) group is a group of UEs performing downlink transmission. An uplink UE group is a group of UEs performing uplink transmission. A procedure of transmitting the control information is performed by a base station (BS).

The RNTI mapped to the downlink UE group and the uplink UE group and a UE ID indicating a UE in the downlink UE group and the uplink UE group are transmitted to the UE.

The RNTI is not a UE specific identifier but an identifier for all combinations of the downlink UE group and uplink UE group to which the UE belongs. That is, the UE in the downlink UE group and the UE in the uplink UE group commonly use a specific RNTI. Accordingly, control information of the downlink UE group and control information of the uplink UE group may be transmitted through one PDCCH or sPDCCH.

The UE ID may be used to determine where control information thereof is located in the control information of the downlink UE group or the control information of the uplink UE group.

The RNTI and the UE ID may be transmitted through radio resource control (RRC).

The RNTI and the UE ID are used to configure the control information. That is, this is a step in which the BS configures a DCI format. The control information includes an identification information field indicating whether there is scheduling information for the UE, a scheduling information field of the UE in the downlink UE group, a scheduling information field of the UE in the uplink UE group, and a first CRC field.

It is regarded in the present specification that the identification information field corresponds to an information bit indicating whether there is scheduling information for each UE in the downlink/uplink UE group. Herein, however, it may be information indicating whether there is scheduling information for the UE.

The first CRC field is encoded for the scheduling information field of the UE in the downlink UE group and the scheduling information field of the UE in the uplink UE group. That is, the first CRC field is commonly used for the scheduling information field of the UE in the downlink UE group and the scheduling information field of the UE in the uplink UE group. If a length of the scheduling information field of the UE in each UE group is constant irrespective of whether there is scheduling information for the UE, the first CRC field may be encoded for the identification information field and the scheduling information field of the UE in each UE group.

The number of UEs in each UE group may be controlled to be constant so that the length of the scheduling information field of the UE in each UE group is constant. The number of UEs in the downlink UE group may have a first constant value, and the number of UEs in the uplink UE group may have a second constant value. The first constant value is not necessarily equal to the second constant value.

If there is no UE in the downlink UE group, that is, if the downlink UE group is an empty set, the scheduling information field of the UE in the downlink UE group may be subjected to zero padding by the first constant value. If there is no UE in the uplink UE group, that is, if the uplink UE group is an empty set, the scheduling information field of the UE in the uplink UE group may be subjected to zero padding by the second constant value. This is to avoid an increase in the number of blind decoding attempts of the UE when there is a change in a length of control information. The length of the control information may be maintained to be constant by performing the zero padding.

In addition, a sum of the number of UEs in the downlink UE group and the number of UEs in the uplink UE group may be constant. Likewise, a total length of control information is matched by allowing the number of UEs groups to be identical in the downlink UE group and the uplink UE group. Accordingly, the increase in the number of blind decoding attempts of the UE can be avoided.

If a length of the scheduling information field of the UE in each UE group is changed according to whether there is scheduling information of the UE, a second CRC field may be added in the control information. In this case, the second CRC field may be encoded only for the identification information field, and the first CRC field may be encoded only for the scheduling information field of the UE in each UE group. The first CRC field or the second CRC field is masked by using an RNTI mapped to a combination of respective UE groups.

Lastly, the aforementioned control information is transmitted to the UE.

In addition, a BS for transmitting control information in a wireless communication system is proposed.

The BS includes a radio frequency (RF) unit for transmitting and receiving a radio signal and a processor operatively coupled to the RF unit. The processor receives control information from the BS. The processor transmits to the UE an RNTI mapped to the downlink UE group and the uplink UE group and a UE ID indicating a UE in the downlink UE group and the uplink UE group. In addition, the processor uses the RNTI and the UE ID to configure the control information. That is, this is a step in which the BS configures a DCI format. The control information includes an identification information field indicating whether there is scheduling information for the UE, a scheduling information field of the UE in the downlink UE group, a scheduling information field of the UE in the uplink UE group, and a first CRC field. The first CRC field is encoded for the scheduling information field of the UE in the downlink UE group and the scheduling information field of the UE in the uplink UE group. In addition, the processor transmits the configured control information to the UE.

In addition, the present specification proposes a method of decoding control information by a UE in a wireless communication system.

First, terminologies are summarized. Control information corresponds to a DCI format of a PDCCH or a sPDCCH, and scheduling information is included in the control information. An RNTI corresponds to a C-RNTI. Encoding corresponds to a coding process, and decoding corresponds to a decoding process. A downlink UE group is a group of UEs performing downlink transmission. An uplink UE group is a group of UEs performing uplink transmission. A procedure of decoding the control information is performed by a UE.

The control information is received from a BS. That is, this is a step in which a UE receives a DCI format configured by the BS. The control information includes an identification information field indicating whether there is scheduling information for the UE, a scheduling information field of the UE in the downlink UE group, a scheduling information field of the UE in the uplink UE group, and a first CRC field.

It is regarded in the present specification that the identification information field corresponds to an information bit indicating whether there is scheduling information for each UE in the downlink/uplink UE group. Herein, however, it may be information indicating whether there is scheduling information for the UE.

The first CRC field is encoded for the scheduling information field of the UE in the downlink UE group and the scheduling information field of the UE in the uplink UE group. That is, the first CRC field is commonly used for the scheduling information field of the UE in the downlink UE group and the scheduling information field of the UE in the uplink UE group. If a length of the scheduling information field of the UE in each UE group is constant irrespective of whether there is scheduling information for the UE, the first CRC field may be encoded for the identification information field and the scheduling information field of the UE in each UE group. If a length of the scheduling information field of the UE in each UE group is changed according to whether there is scheduling information of the UE, a second CRC field may be added in the control information. In this case, the second CRC field may be encoded only for the identification information field, and the first CRC field may be encoded only for the scheduling information field of the UE in each UE group. The first CRC field or the second CRC field is masked by using an RNTI mapped to a combination of respective UE groups.

The RNTI mapped to the downlink UE group and the uplink UE group and a UE ID indicating the UE in the downlink UE group and the uplink UE group are received from the BS.

The RNTI is not a UE specific identifier but an identifier for all combinations of the downlink UE group and uplink UE group to which the UE belongs. That is, the UE in the downlink UE group and the UE in the uplink UE group commonly use a specific RNTI. Accordingly, control information of the downlink UE group and control information of the uplink UE group may be transmitted through one PDCCH or sPDCCH.

The UE ID may be used to determine where control information thereof is located in the control information of the downlink UE group or the control information of the uplink UE group.

The control information is decoded by using the RNTI and the UE ID. That is, the UE may perform decoding by using the RNTI for CRC checking in the control information and by using the UE ID to discover its control information.

In addition, the present specification proposes a UE for decoding control information in a wireless communication system.

The UE includes a radio frequency (RF) unit for transmitting and receiving a radio signal and a processor operatively coupled to the RF unit. The processor receives control information from a BS. The control information includes an identification information field indicating whether there is scheduling information for the UE, a scheduling information field of a UE in the downlink UE group, a scheduling information field of a UE in the uplink UE group, and a first cyclic redundancy checking (CRC) field. The first CRC field is encoded for the scheduling information field of the UE in the downlink UE group and the scheduling information field of the UE in the uplink UE group. In addition, the processor receives from the BS the RNTI mapped to the downlink UE group and the uplink UE group and a UE ID indicating the UE in the downlink UE group and the uplink UE group. In addition, the processor decodes the control information by using the RNTI and the UE ID.

According to the proposed method, a downlink control signal and an uplink control signal can be simultaneously transmitted on a limited low-latency resource. Therefore, since transmission using a sTTI is enabled by using at least 4 RBs, low-latency transmission is also enabled in an LTE system having a system band of 1.4 MHz.

BRIEF DESCRIPTION OF THE DRAWINGS

FIG. 12 shows an example of configuring control information according to an embodiment of the present specification.

FIG. 13 shows an example of configuring control information according to an embodiment of the present specification.

FIG. 14 shows an example of configuring control information according to an embodiment of the present specification.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-TDMA in an uplink.

For clarity of explanation, the following description will focus on the 3GPP LTE. However, technical features of the present invention are not limited thereto.

Figure 1:
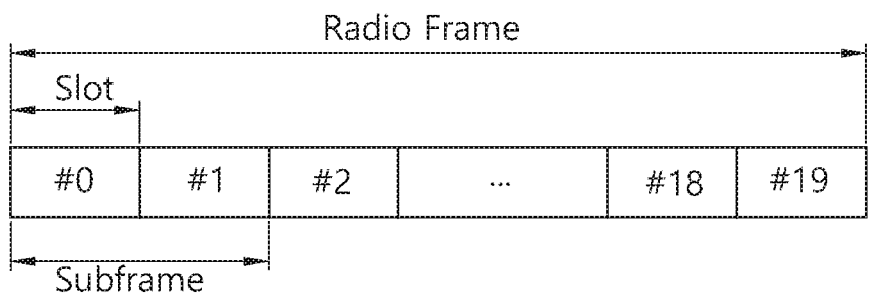
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
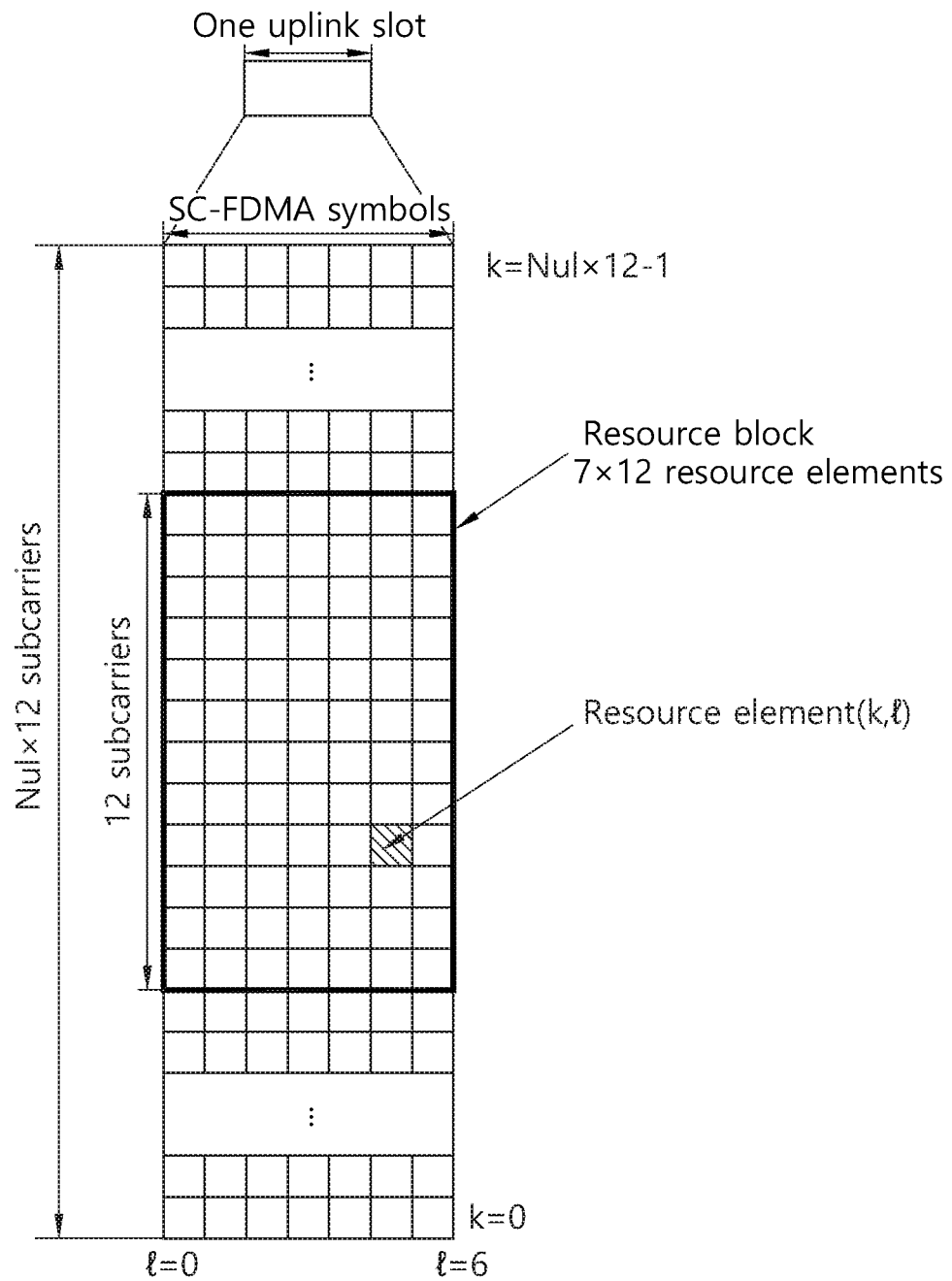
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, ..., $N^{UL}$×12−1) denotes a subcarrier index in the frequency domain, and l(l=0, ..., 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
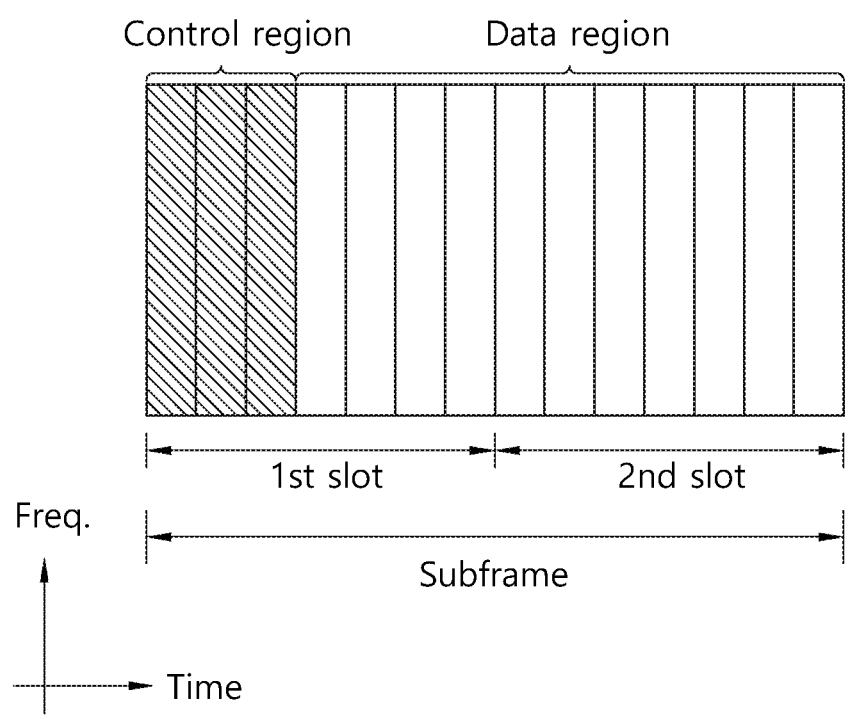
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
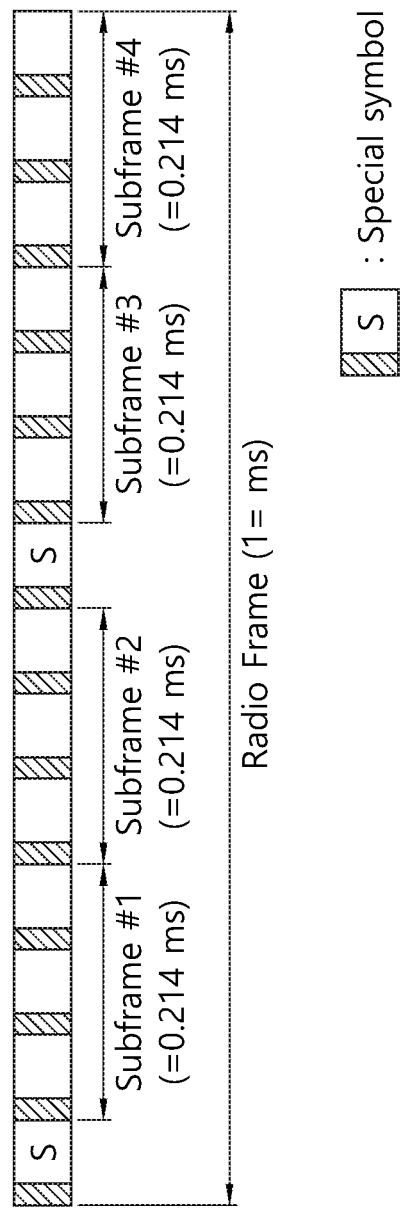
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
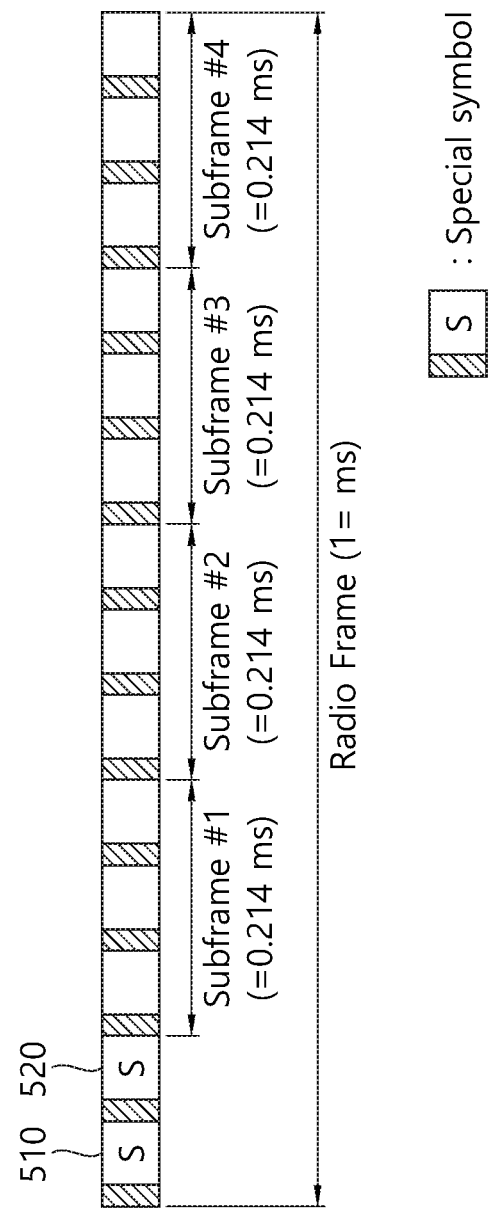
FIG. 5 shows an example of the structure of a radio frame in which special symbols have been contiguously disposed at the front part of the radio frame.
Figure 6:
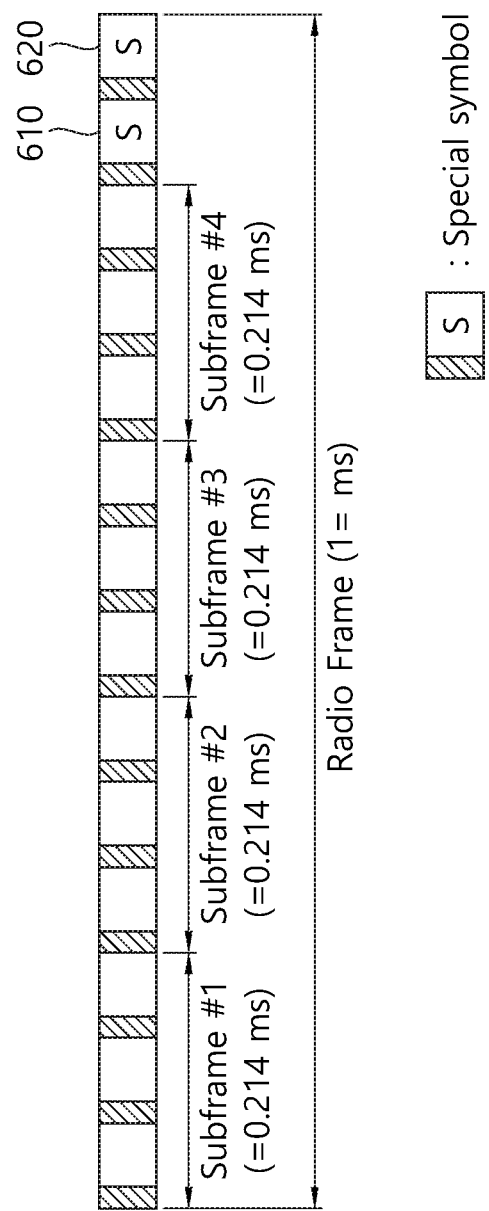
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH (s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

However, since a transmission length of a data channel is decreased in the sTTI, there is a problem in that an overhead of a control signal is increased in general. If a control signal of the existing LTE system is directly utilized, a minimum bandwidth for applying the sTTI is increased due to the overhead of the control signal. In addition, only a small number of UEs can transmit and receive signals simultaneously through the sTTI in a given bandwidth.

For example, in a case where a DCI format 1A is used for downlink transmission in an LTE system having 50 resource blocks (RBs) in a bandwidth of 10 MHz, if scheduling is performed in unit of 3 RBs, 36 bits are required in total. In general, if a 1/3 coding rate and a quadrature phase shift keying (QPSK) modulation scheme are used, 54 resource elements (REs) are required in total for a DL grant. If it is assumed that a data channel of the sTTI has REs twice more than the control channel, 162 REs are required in total (54+54×2=162) in order for one UE to transmit a downlink signal.

Figure 7:
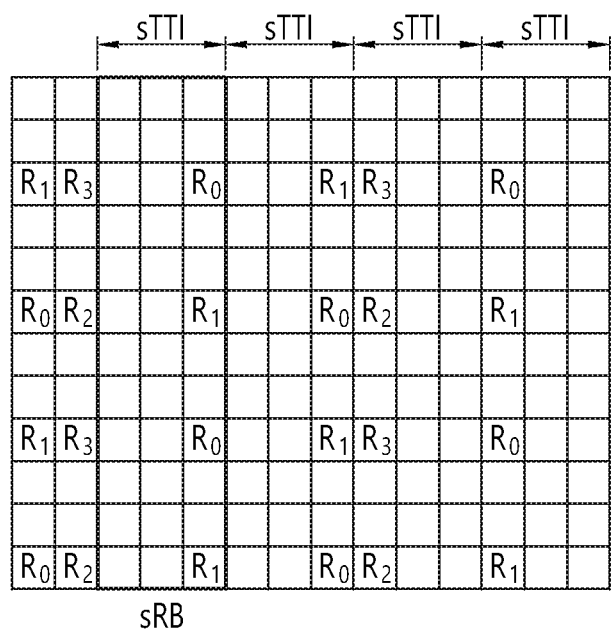
FIG. 7 shows an example of a sTTI configuration having 3 OFDM symbols.

FIG. 7 shows an example of a sTTI structure having 3 OFDM symbols.

In FIG. 7, a short RB (sRB) consists of 12 subcarriers and 3 OFDM symbols in total. Although one sRB consists of 36 REs, 32 REs can transmit signals in practice except for a cell-specific reference signal (CRS). In addition, the number of REs capable of transmitting signals in a first symbol of the sTTI is 8 in the presence of the CRS. It is considered a situation where a control signal is arranged only in the first symbol of the sTTI to satisfy a user plane latency of 1 ms in the sTTI structure having 3 OFDM symbols. Then, 7 sRBs are required to transmit one DL grant. This is because at least 54 REs required for the DL grant are secured given that 8×7=56.

A UL grant must also be transmitted in a system in addition to the DL grant. Therefore, about 14 sRBs are required to transmit one DL grant and one UL grant. This implies that only 4 downlink UEs and 4 uplink UEs cannot help simultaneously transmitting control signals in a system having 50 RBs. In addition, an operation of transmitting the control signal may be impossible in a system having 6 RBs or 10 RBs. In this case, the existing UE must perform communication by using 4 RBs during a TTI. Therefore, the control signal needs to be designed to be compact to decrease an overhead of the control signal.

Figure 8:
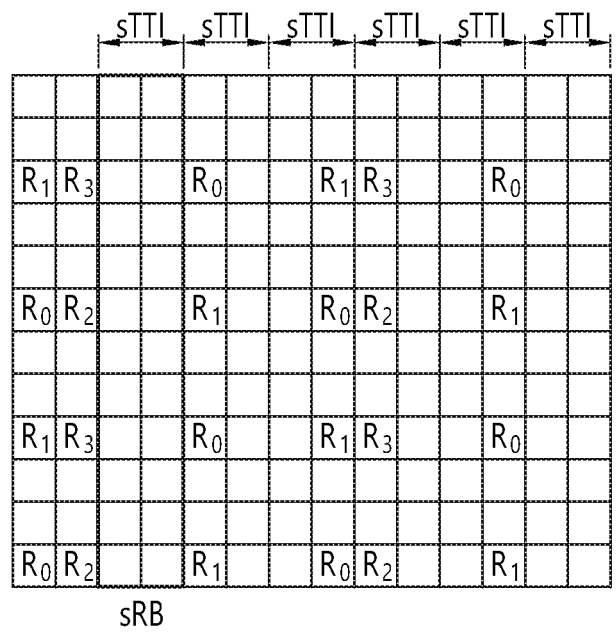
FIG. 8 shows an example of a sTTI configuration having 2 OFDM symbols.

FIG. 8 shows an example of a sTTI structure having 2 OFDM symbols.

In the sTTI structure having 2 OFDM symbols, a user plane latency of 1 ms can be achieved even if a control signal is transmitted across the entirety of the sTTI instead of a first OFDM symbol of the sTTI. That is, the control signal can be transmitted as in an enhanced PDCCH (ePDCCH) in an LTE system.

However, if a length of the sTTI is further limited to 2 OFDM symbols, the aforementioned problem becomes more serious. In the sTTI having 2 OFDM symbols, one sRB consists of up to 24 REs and at least 20 REs. Therefore, if an overhead of a control signal is maintained to 33%, one UE requires 9 sRBs to transmit a downlink signal. This is because at least 54 REs required for a DL grant are secured given that 20×0.33×9=59.4. 3 sRBs are also required to transmit an uplink control signal. Therefore, if control signals are arranged in an FDM manner in a sTTI structure having a length of two OFDM symbols, the control signals can be simultaneously transmitted to up to 4 downlink UEs and 4 uplink UEs in a system having 50 RBs. In this case, the existing UE must perform communication by using two RBs.

Therefore, the present specification proposes a method of reducing an overhead of a control signal. Hereinafter, a method of mapping a cell-radio network temporary identifier (C-RNTI) masked to a cyclic redundancy checking (CRC) of a short PDCCH (sPDCCH) in unit of UE groups will be described. Specifically, it is characterized in that a downlink UE group and an uplink UE group are aggregated and mapped to one C-RNTI. In doing so, instead of attaching the CRC to downlink control information (DCI) of each UE, one CRC is attached to DCI of a UE group to decrease the total number of bits of control information.

For clarity of explanation, terminologies are summarized. Control information corresponds to a DCI format of a PDCCH or a sPDCCH, and scheduling information is included in the control information. An RNTI variously corresponds to a C-RNTI, a temporary identifier, a UE identifier, or the like. Encoding corresponds to a coding process, and decoding corresponds to a decoding process. A downlink UE group is a group of UEs performing downlink transmission. An uplink UE group is a group of UEs performing uplink transmission. A procedure of transmitting the control information is performed by a BS. However, a technical feature or scope of the present specification is not limited or affected by the terminologies summarized above.

First, a method of mapping a C-RNTI to a UE group will be described below.

It is assumed that K denotes the number of UEs intending to perform low-latency communication in any cell, M denotes the number of downlink groups, and N denotes the number of uplink groups. Herein, $1<=M<=K$, and $1<=N<=K$. In addition, it is assumed that Dm denotes an $m^{th}$ downlink UE group, and Un denotes an $n^{th}$ uplink UE group. Each UE must belong to one or more downlink UE groups or one or more uplink UE groups. Since the UE may belong to a plurality of downlink UE groups or a plurality of uplink UE groups, $\Sigma_{m=1}^{M}|Dm|\geq K$ and $\Sigma_{n=1}^{N}|Un|\geq K$. However, when an uplink resource for a sTTI exits only in a competitive resource, each UE may not belong to the uplink UE group.

Specifically, a method of mapping an uplink UE group and a downlink UE group to a common C-RNTI will be described. In this method, control signals of the uplink UE group and the downlink UE group are transmitted to one common control channel. The common control channel may be a sPDCCH or a PDCCH. By using this method, the number of bits used as a CRC can be decreased in comparison with a case of separately attaching the CRC by separately transmitting a downlink (DL) grant and an uplink (UL) grant. Accordingly, there is an advantage in that the DL grant and the UL grant can be transmitted by using a much smaller amount of resources.

Herein, it is assumed that Ci denotes an $i^{th}$ C-RNTI value. An $m^{th}$ downlink UE group and an $n^{th}$ uplink UE group may be mapped to the $i^{th}$ C-RNTI value.

$$(Dm, Un) \rightarrow C_i$$

In addition, there may be a case where an uplink control signal is transmitted without a downlink control signal and a case where the downlink control signal is transmitted without the uplink control signal. Therefore, a case of mapping the uplink UE group and the downlink UE group is also included as described below.

$$(0, Un) \rightarrow C_i$$

$$(Dm, 0) \rightarrow C_i$$

A case where both of the uplink control signal and the downlink control signal are not transmitted is excluded from C-RNTI mapping since the control signal itself is not transmitted. Therefore, a maximum value I of the number of C-RNTIs required when M downlink UE groups and N uplink UE groups are present is as follows.

$$I=(M+1)(N+1)-1$$

A combination of all downlink UE groups and uplink UE groups is not necessarily used in a system. Therefore, the C-RNTI may be used only when the number of C-RNTIs is less than the maximum value I. In addition, although a method of mapping a combination between different downlink UE groups and a combination between different uplink UE groups to the C-RNTI is also possible, in this case, there is a disadvantage in that too many C-RNTIs are used. Accordingly, this case is not described in the present specification.

Each UE needs to know a downlink UE group to which it belongs to decode a control signal, all C-RNTI values to which the uplink UE group is mapped, and its UE-ID in each downlink UE group and each uplink UE group. For example, if any UE is included in $D_1$ and $U_1$, the any UE needs to know C-RNTI values to which $(D_1, Un)$, n=1, 2, . . . , N is mapped, C-RNTI values to which $(Dm, U_1)$, m=1, 2, . . . , M is mapped, and C-RNTI values to which $(D_1, 0)$ and $(0, U_1)$ are mapped. In addition, the any UE needs to know a UE ID in a group of $D_1$ and $U_1$. Therefore, the UE receives ((N+M−1)+2) C-RNTI values in total from the BS, and needs to perform CRC checking on all of the ((N+M−1)+2) C-RNTI values.

The number of UEs which need to receive information from a corresponding control information may change depending on a combination of the downlink UE group and the uplink UE group. This causes a change in a control signal format and a change in a control signal length. That is, it is characterized in that a downlink control information (DCI)

format changes depending on a C-RNTI value. However, the change in the control signal length may lead to an increase in an overhead of blind decoding for the UE. A method of avoiding this includes: a method (1) of maintaining the number of UEs in each UE group to be constant; and a method (2) of using only a combination of a UE group capable of transmitting control information in a designated control signal length.

Hereinafter, the method (1) of maintaining the number of UEs in each UE group to be constant is described.

In the method (1), the number of UEs of each downlink UE group and the number of UEs of each uplink UE group are maintained to a specific constant value (|Dm|=K, |Un|=L). In addition, if it is assumed that a length of downlink control information is equal to a length of uplink control information, a control information length of (Dm, Un) may be maintained to be constant. However, since (Dm, Un) may have a control information length or coding rate different from that of (Dm, 0) and (0, Un), blind decoding needs to be performed separately. Therefore, in order for the UE to decode a sPDCCH in a sRBG, blind decoding may be necessary at least three times. However, when (Dm, 0) and (0, Un) are applied to further decrease the number of times of blind decoding attempts, zero padding may be used to match the coding rate and length of the control information. In this case, the control information may be identified by the CRC, and at least one blind decoding attempt is enough. Alternatively, if N control information bits are used to transmit information of (Dm, 0) and (0, Un), it is possible to use a compact DCI format in which only N/2 control information bits and N/2 control information bits are used respectively in a downlink and an uplink in a (Dm, Un) combination.

Hereinafter, the method (2) using only a combination of a UE group capable of transmitting control information in a designated control signal length is described.

Likewise, it is assumed that a bit length of downlink control information is equal to a bit length of an uplink control information. In the method (2), a control information length is maintained to be constant by maintaining the number of UEs to a specific constant value when an uplink UE group and a downlink UE group are combined. For example, it is assumed that there are three UEs intending to perform low latency transmission. The three UEs are $UE_1$, $UE_2$, and $UE_3$. In addition, the UE group is defined as $D_1=\{UE_1\}$, $D_2=\{UE_2\}$, $D_3=\{UE_3\}$, $D_4=\{UE_1, UE_2\}$, $D_5=\{UE_1, UE_3\}$, $D_6=\{UE_2, UE_3\}$, $D_7=\{UE_1, UE_2, UE_3\}$, $U_1=\{UE_1\}$, $U_2=\{UE_2\}$, $U_3=\{UE_3\}$, $U_4=\{UE_1, UE_2\}$, $U_5=\{UE_1, UE_3\}$, $U_6=\{UE_2, UE_3\}$, $U_7=\{UE_1, UE_2, UE_3\}$. In this case, a combination to which a C-RNTI is applied may be limited to a combination between Dm, m=1, 2, 3 and Un, n=4, 5, 6, a combination between Dm, m=4, 5, 6 and Un, n=1, 2, 3, and a combination ($D_7$, 0) between $D_7$ and an uplink empty set, and a combination (0, $U_7$) between a downlink empty set and $U_7$. That is, the number of UEs of the combination is constant as 3. Herein, 7 C-RNTI values may be used in total, and a length of 7 pieces of control information may be maintained to be identical.

In the proposed method, there is no need to additionally perform blind decoding if a length of control information and a coding rate are identical, and after decoding, a specific UE group to which the UE belongs is confirmed by using different C-RNTI values. That is, CRC checking is performed by using the C-RNTI. For another example, even if the UE is included in two downlink UE group, the number of times of performing CRC checking can be increased without an increase in the number of blind decoding attempts by matching the number of bits for expressing a UE ID of each UE group (or by matching the number of UEs in each UE group).

A detailed embodiment is described below to facilitate understanding of the method proposed in the present specification.

For example, it is assumed that the number of UEs in a cell is 8, the number of downlink UE groups is 2, and the number of uplink UE groups is 2 (K=8, M=N=2). In addition, the number of downlink UE groups and the number of uplink UE groups are both 4 (|Dm|=4, m=1, 2|Un|=4, n=1, 2). That is, it may be defined as $D_1=\{UE_1, UE_2, UE_3, UE_4\}$, $D_2=\{UE_5, UE_6, UE_7, UE_8\}$, $U_1=\{UE_1, UE_2, UE_3, UE_4\}$, $U_2=\{UE_5, UE_6, UE_7, UE_8\}$. The aforementioned methods (1) and (2) may be both applied according to the above assumption.

Control information transmitted through a control signal is shown in the following table.

TABLE 1

| Configuration information in control signal | Required number of bits |
|---|---|
| Information of UE ID allocated to downlink resource | 4 bits (bitmap scheme is applied) |
| Downlink control information per UE | Number of UEs × N bits |
| Information of UE ID allocated to uplink resource | 4 bits (bitmap scheme is applied) |
| Uplink control information per UE | Number of UEs × N bits |

In order to decode a control signal, each UE needs to know all C-RNTI values to which a downlink UE group and uplink UE group including the UE are mapped and a UE ID of the UE in each downlink UE group and each uplink UE group. The C-RNTI value required in the present embodiment may be mapped as follows.

$(D_1, U_1) \rightarrow C_1$ $(D_1, U_2) \rightarrow C_2$ $(D_2, U_1) \rightarrow C_3$ $(D_2, U_2) \rightarrow C_4$ Herein, a combination of (Dm, 0) and (0, Un) is excluded since it does not satisfy a condition of |Dm|=4,m=1, 2|Un|=4,n=1, 2.

Figure 9:
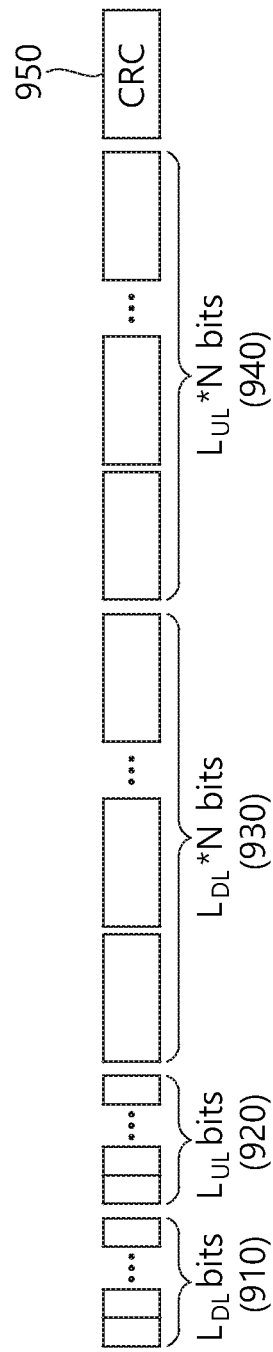
FIG. 9 shows an example of arranging control information in a common control signal.

FIG. 9 shows an example of arranging control information in a common control signal.

For example, if a $UE_1$ is included in $D_1$ and $U_1$, the $UE_1$ needs to know $C_1$ and $C_2$ to receive a downlink control signal, and needs to know $C_1$ and $C_3$ to receive an uplink control signal. In addition, the $UE_1$ needs to receive its UE ID in $D_1$ and $U_1$ through uplink layer signaling. The uplink layer signaling may be radio resource control (RRC) signaling.

Herein, through an agreement between a BS and a UE, it is assumed that the UE may use a UE ID for a UE group to recognize an arrangement of control information in a control signal. FIG. 9 shows an example of arranging control information agreed between the BS and the UE.

Referring to FIG. 9, $L_{DL}$ bits 910 are a bitmap indicating whether there is scheduling information per UE in a downlink UE group, and $L_{UL}$ bits 920 are a bitmap indicating whether there is scheduling information per UE in an uplink UE group. However, the $L_{DL}$ bits 910 and the $L_{UL}$ bits 920 indicate identification information per UE, and are not always limited to a bitmap format, and thus may be used in various manners. For example, if there is scheduling information for the $UE_1$, the $UE_2$, and the $UE_3$ in a downlink and there is scheduling information for the $UE_1$ and $UE_2$ in an uplink, the $L_{DL}$ bits 910 may be '1110', and the $L_{UL}$ bits 920 may be '1100'.

The control information of FIG. 9 also includes control information of each UE in a downlink UE group and control information of each UE in an uplink UE group. If N bits are control information bits required per UE without distinction of a downlink and an uplink, the control information of each UE in the downlink UE group may be expressed by $L_{DL} \times N$ bits 930, and the control information of each UE in the uplink UE group may be expressed by $L_{UL} \times N$ bits 940.

Eventually, one CRC 950 may be attached and used for a control information bit of the $L_{DL}$ bits 910, the $L_{UL}$ bits 920, the $L_{DL} \times N$ bits 930, and the $L_{UL} \times N$ bits 940. That is, the BS generates the CRC by using all of the $L_{DL}$ bits 910, the $L_{UL}$ bits 920, the $L_{DL} \times N$ bits 930, and the $L_{UL} \times N$ bits 940 by regarding the $L_{DL}$ bits 910, the $L_{UL}$ bits 920, the $L_{DL} \times N$ bits 930, and the $L_{UL} \times N$ bits 940 as a payload of a DCI format. In this case, the CRC is masked by using a C-RNTI (herein, C1, C2, C3, C4). That is, the entire control information is configured by attaching the masked CRC 950 to the $L_{DL}$ bits 910, the $L_{UL}$ bits 920, the $L_{DL} \times N$ bits 930, and the $L_{UL} \times N$ bits 940.

The UE may use the C-RNTI (herein, C1, C2, C3, C4) received from the BS to check the CRC 950, and may use a UE ID to recognize its control information location in a UE group. That is, the UE may perform blind decoding on the control information at least one time by using the C-RNTI and the UE ID.

Figure 10:
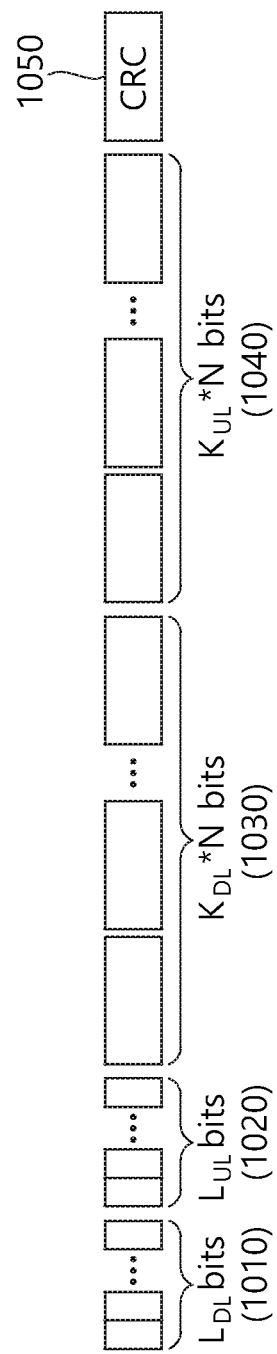
FIG. 10 shows an example of arranging control information when a common control signal changes in size.

FIG. 10 shows an example of arranging control information when a common control signal changes in size.

As shown in FIG. 10, a BS may arrange only control information of a UE which transmits scheduling information in practice.

Likewise, $L_{DL}$ bits 1010 are a bitmap indicating whether there is scheduling information per UE in a downlink UE group, and $L_{UL}$ bits 1020 are a bitmap indicating whether there is scheduling information per UE in an uplink UE group. However, the $L_{DL}$ bits 1010 and the $L_{UL}$ bits 1020 indicate identification information per UE, and are not always limited to a bitmap format, and thus may be used in various manners. For example, if there is scheduling information for the $UE_1$, the $UE_2$, and the $UE_3$ in a downlink and there is scheduling information for the $UE_1$ and $UE_2$ in an uplink, the $L_{DL}$ bits 1010 may be '1110', and the $L_{UL}$ bits 1020 may be '1100'.

The control information of FIG. 10 also includes control information of each UE in a downlink UE group and control information of each UE in an uplink UE group. However, in FIG. 10, the control information is included only for a UE of which a bitmap is 1 in the downlink UE group. $K_{DL}$ may be the number of UEs of which a bitmap is 1 in the downlink UE group, and $K_{UL}$ may be the number of UEs of which a bitmap is 1 in the uplink UE group. If N bits are control information bits required per UE without distinction of a downlink and an uplink, the control information of each UE in the downlink UE group may be expressed by $L_{DL} \times N$ bits 1030, and the control information of each UE in the uplink UE group may be expressed by $L_{UL} \times N$ bits 1040.

Eventually, one CRC 1050 may be attached and used for a control information bit of the $L_{DL}$ bits 1010, the $L_{UL}$ bits 1020, the $L_{DL} \times N$ bits 1030, and the $L_{UL} \times N$ bits 1040. That is, the BS generates the CRC by using all of the $L_{DL}$ bits 1010, the $L_{UL}$ bits 1020, the $L_{DL} \times N$ bits 1030, and the $L_{UL} \times N$ bits 1040 by regarding the $L_{DL}$ bits 1010, the $L_{UL}$ bits 1020, the $L_{DL} \times N$ bits 1030, and the $L_{UL} \times N$ bits 1040 as a payload of a DCI format. In this case, the CRC is masked by using a C-RNTI (herein, C1, C2, C3, C4). That is, the entire control information is configured by attaching the masked CRC 1050 to the $L_{DL}$ bits 1010, the $L_{UL}$ bits 1020, the $L_{DL} \times N$ bits 1030, and the $L_{UL} \times N$ bits 1040.

The UE may use the C-RNTI (herein, C1, C2, C3, C4) received from the BS to check the CRC 1050, and may use a UE ID to recognize its control information location in a UE group. That is, the UE may decode the control information by using the C-RNTI and the UE ID.

Although there is an advantage in FIG. 10 that an average size of a control signal is decreased, since the control signal increases in size, there is a disadvantage in that the number of blind decoding attempts performed by the UE to decode the control signal is increased. To overcome such a disadvantage, the following embodiment may be considered in which control information indicating a presence/absence of scheduling information per UE in a UE group and control information of the UE group are transmitted separately.

Figure 11:
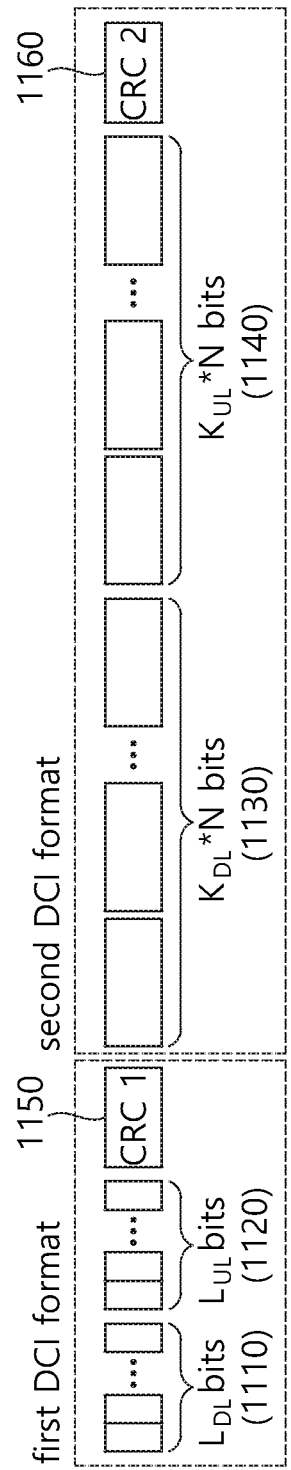
FIG. 11 shows an example in which control information indicating a presence/absence of scheduling information per UE and control information of a UE group are transmitted separately.

FIG. 11 shows an example in which control information indicating a presence/absence of scheduling information per UE and control information of a UE group are transmitted separately.

To solve the problem of FIG. 10, the information indicating the presence/absence of the scheduling information per UE in the UE group and the control information in the UE group are encoded by using a separate CRC.

Likewise, $L_{DL}$ bits 1110 are a bitmap indicating whether there is scheduling information per UE in a downlink UE group, and $L_{UL}$ bits 1120 are a bitmap indicating whether there is scheduling information per UE in an uplink UE group. However, the $L_{DL}$ bits 1110 and the $L_{UL}$ bits 1120 indicate identification information per UE, and are not always limited to a bitmap format, and thus may be used in various manners. For example, if there is scheduling information for the $UE_1$, the $UE_2$, and the $UE_3$ in a downlink and there is scheduling information for the $UE_1$ and $UE_2$ in an uplink, the $L_{DL}$ bits 1110 may be '1110', and the $L_{UL}$ bits 1120 may be '1100'. Herein, an information bit for the $L_{DL}$ bits 1110 and the $L_{UL}$ bits 1120 is transmitted by using a CRC1 1150. That is, the BS generates a CRC 1 by using the $L_{DL}$ bits 1110 and the $L_{UL}$ bits 1120 by regarding the $L_{DL}$ bits 1110 and the $L_{UL}$ bits 1120 as a payload of a first DCI format. In this case, the CRC 1 is masked by using a C-RNTI (herein, C1, C2, C3, C4). That is, control information of a first DCI format is configured by attaching the masked CRC1 1150 to the $L_{DL}$ bits 1110 and the $L_{UL}$ bits 1120.

In addition, $K_{DL}$ may be the number of UEs of which a bitmap is 1 in the downlink UE group, and $K_{UL}$ may be the number of UEs of which a bitmap is 1 in the uplink UE group. If N bits are control information bits required per UE without distinction of a downlink and an uplink, the control information of each UE in the downlink UE group may be expressed by $L_{DL} \times N$ bits 1130, and the control information of each UE in the uplink UE group may be expressed by $L_{UL} \times N$ bits 1140. Herein, an information bit for the $K_{DL} \times N$ bits 1130 and the $K_{UL} \times N$ bits 1140 is transmitted by using a CRC2 1160. That is, the BS generates a CRC 2 by using the $K_{UL} \times N$ bits 1130 and the $K_{UL} \times N$ bits 1140 by regarding the $K_{UL} \times N$ bits 1130 and the $K_{UL} \times N$ bits 1140 as a payload of a second DCI format. In this case, the CRC 2 is masked by using a C-RNTI (herein, C1, C2, C3, C4). That is, control information of the second DCI format is configured by attaching the masked CRC2 1160 to the $K_{DL} \times N$ bits 1130 and the $K_{UL} \times N$ bits 1140.

Herein, although the CRC1 1150 and the CRC2 1160 have the same C-RNTI value (herein, C1, C2, C3, C4), information bits are totally different in the CRC1 1150 and the CRC2 1160. This is because an information bit of the CRC 1 is calculated according to a first DCI format payload ($L_{DL}$ bits 1110 and $L_{UL}$ bits 1120) and C-RNTI value, and an information bit of the CRC 2 is calculated according to a second DCI format payload ($K_{DL} \times N$ bits 1130 and $K_{UL} \times N$ bits 1140) and C-RNTI value.

The embodiment of FIG. 11 has a disadvantage in that the CRC is always transmitted two times, but has an advantage in that the number of blind decoding attempts of the UE can be decreased. It is expected that the embodiment of FIG. 11 is more appropriate when the number of UEs in the UE group is great.

A detailed embodiment is described below to facilitate understanding of the method proposed in the present specification. FIG. 12 to FIG. 14 show an example of configuring control information according to an embodiment of the present specification. That is, FIG. 12 to FIG. 14 show a detailed embodiment of a method applied in the present specification.

Herein, it is assumed that there are three UEs intending to perform low latency transmission. The three UEs are $UE_1$, $UE_2$, and $UE_3$. In addition, the UE group is defined as $D_1=\{UE_1\}$, $D_2=\{UE_2\}$, $D_3=\{UE_3\}$, $D_4=\{UE_1, UE_2\}$, $D_5=\{UE_1, UE_3\}$, $D_6=\{UE_2, UE_3\}$, $D_7=\{UE_1, UE_2, UE_3\}$, $U_1=\{UE_1\}$, $U_2=\{UE_2\}$, $U_3=\{UE_3\}$, $U_4=\{UE_1, UE_2\}$, $U_5=\{UE_1, UE_3\}$, $U_6=\{UE_2, UE_3\}$, $U_7=\{UE_1, UE_2, UE_3\}$. In addition, it is assumed in the present embodiment that |Dm|=2 and |Un|=1 by applying the aforementioned method (1) of constantly maintaining the number of UEs in each UE group.

Since |Dm|=2, only $D_4$, $D_5$, and $D_6$ are left in the downlink UE group, and only $U_1$, $U_2$, and $U_3$ are left in the uplink UE group. Therefore, a combination of Dm, m=4, 5, 6 and Un, n=1, 2, 3 may be mapped to 15 C-RNTIs as shown in FIG. 12 to FIG. 14.

It is assumed in FIG. 12 that a BS provides a DL grant for the $UE_1$ and the $UE_2$. The BS may perform encoding by using $C_1$. When $C_1$ is used, a length of control information designated as |Dm|=2 and |Un|=1 varies and thus blind decoding may be additionally performed from a perspective of the UE. Therefore, the length of control information may be maintained by performing zero padding on a UL grant part by a length of 1. That is, a DCI format configured by the BS may be configured as $UE_1$ DL grant+$UE_2$ DL grant+zero padding+$C_1$(CRC masking).

It is assumed in FIG. 13 that a BS provides a DL grant for the $UE_1$. The BS may use $C_1$ or $C_5$. Which C-RNTI is used is an implementation issue of the BS. If the BS determines to use $C_1$, the BS may configure a DCI format such as $UE_1$ DL grant+$UE_2$ DL grant(Null)+zero padding+$C_1$(CRC masking). That is, since a DL grant is not provided for the $UE_2$, a null value is provided, and zero padding is performed on a UL grant part by a length of 1 to maintain the length of control information. If the BS determines to use $C_5$, the BS may configure the DCI format such as $UE_1$ DL grant+$UE_3$ DL grant(Null)+zero padding+$C_5$(CRC masking).

It is assumed in FIG. 14 that a BS provides a DL grant for the $UE_1$, the $UE_2$, and the $UE_3$. In this case, it is proposed a method in which the BS first provides control information for the $UE_1$ and the $UE_2$, and transmits control information for the $UE_3$ at a later time. That is, $C_1$ may be used to configure a DCI format for the $UE_1$ and the $UE_2$, and $C_5$ or $C_9$ may be used to configure a DCI format for the $UE_3$.

First, the BS may configure and transmit the DCI format for the $UE_1$ and the $UE_2$ such as $UE_1$ DL grant+$UE_2$ DL grant+zero padding+$C_1$(CRC masking). Next, if the BS determines to use $C_5$, the BS may configure and transmit the DCI format such as $UE_1$ DL grant(Null)+$UE_3$ DL grant+zero padding+$C_5$(CRC masking). If the BS determines to use $C_9$, the BS may configure and transmit the DCI format such as $UE_2$ DL grant(Null)+$UE_3$ DL grant+zero padding+$C_9$(CRC masking).

Next, a method of delivering a C-RNTI through higher layer signaling is described.

C-RNTI values to be used by a UE to receive a control signal and a UE ID in a UE group may be transmitted through higher layer signaling. Herein, the higher layer signaling may be RRC signaling. However, the present invention is not limited thereto, and thus a variety of higher layer signaling is possible.

A method of transmitting information regarding the C-RNTI values and the UE ID through the higher layer signaling may be classified into a method (1) in which a BS randomly allocates a C-RNTI of each UE group and a method (2) in which the BS allocates the C-RNTI with a specific rule. The method (1) increases a degree of freedom for C-RNTI allocation of the BS, but disadvantageously increases a signaling overhead. The method (2) decreases the degree of freedom for C-RNTI allocation of the BS but advantageously decreases the signaling overhead. A case where the number of UEs in a UE group is equally distributed is assumed in an embodiment to which the present specification is applied.

When the BS randomly allocates the C-RNTI, there is a need to transmit C-RNTI values for all DL grants to be used when the UE performs CRC checking, C-RNTI values for all UL grants, and a UE ID in a UE group to which the UE belongs. For example, if any UE is included in $D_1$ and $U_1$, the any UE needs to know C-RNTI values to which ($D_1$, Un), n=1, 2, . . . , N is mapped, C-RNTI values to which (Dm, $U_1$), m=1, 2, . . . , M is mapped, and C-RNTI values to which ($D_1$, 0) and (0, $U_1$) are mapped. In addition, the any UE needs to know a UE ID in a group of $D_1$ and $U_1$. Therefore, the UE receives ((N+M−1)+2) C-RNTI values in total from the BS, and needs to perform CRC checking on all of the ((N+M−1)+2) C-RNTI values.

Therefore, 16×(N+M+1) bits are required to receive (N+M+1) C-RNTI values. The number of bits required for CRC checking is 16 bits. In addition, to represent the UE ID in the UE group to which the UE belongs, [log₂|Dm|] bits are required per downlink UE group to which the UE belongs and [log₂|Un|] bits are required per uplink UE group to which the UE belongs. In addition, if the UE is allowed to be included in one or more groups, the number of downlink UE group and the number of uplink UE groups to which the UE is included also need to be transmitted. The following table shows a detailed embodiment of higher layer signaling information when the BS randomly allocates the C-RNTI.

TABLE 2

| Higher layer signaling information | The number of bits required to present information |
| --- | --- |
| The number K of UEs available in corresponding RBG | [log₂$k_{max}$] ($k_{max}$: the maximum number of UE) |
| The number M of downlink UE groups | [log₂K] |
| The number N of uplink UE groups | [log₂K] |

TABLE 2-continued

| Higher layer signaling information | The number of bits required to present information |
|---|---|
| The number of downlink UE groups to which UE belongs | [$\log_2 M$] |
| C-RNTI used in downlink UE group to which UE belongs | 'The number of downlink UE groups to which UE belongs' × 16 (M + 1) |
| UE ID in downlink UE group | 'The number of downlink UE groups to which UE belongs' × [$\log_2 K/M$] |
| The number of uplink UE groups to which UE belongs | [$\log_2 N$] |
| C-RNTI used in uplink UE group to which UE belongs | 'The number of uplink UE groups to which UE belongs' × [$\log_2 N$] or M bits (when expressed in bitmap) |
| UE ID in uplink UE group | 'The number of downlink UE groups to which UE belongs' × [$\log_2 K/N$] |

Since it is assumed herein that the number of UEs in the UE group is equally distributed, K/M denotes the number of UEs per one downlink UE group, and K/N denotes the number of UEs per one uplink UE group.

In Table 2, since the higher layer signaling sequentially transmits the C-RNTI based on the UE group, the UE may know at which order of the UE group the same C-RNTI value as the C-RNTI received from the BS belongs. In addition, a UE ID value in a corresponding UE group may also be known. However, although the UE cannot receive a UE group index value of the UE group to which the UE belongs, a control signal can be decoded even if there is no index value.

It is assumed that, when the BS allocates the C-RNTI with a specific rule, the UE also knows the rule. For example, if the BS allocates C-RNTI values to be used in any RBG as consecutive values, the BS informs the UE of a start value $C_s$ of a C-RNTI of an RBG and an index of a UE group to which the UE belongs. In doing so, the UE may be allowed to calculate the C-RNTI to be used for decoding. In this case, it is assumed that a method of mapping the RNTI by combining an index of a downlink UE group and an index of an uplink UE group to which the UE belongs is shared in advance between the UE and the BS. Therefore, there is no need to separately transmit an information bit for the C-RNTI to be used in the UE group to which the UE belongs. Accordingly, an information amount of higher layer signaling is slightly decreased in comparison with a case where the BS randomly allocates the C-RNTI.

More specifically, the UE group and the C-RNTI may be mapped by using the following rule.

$$(Dm, 0) \rightarrow C_{s-1+m}$$

$$(0, Un) \rightarrow C_{s-1+M+n}$$

$$(Dm, Un) \rightarrow C_{(s-1)+(M+N)+m+Mn}$$

When applying the method in which the BS allocates the C-RNTI with the above rule, information to be delivered through the higher layer signaling includes a start point of the C-RNTI, the number of UEs in a corresponding RBG (the number of UEs in a cell), the number of uplink UE groups and downlink UE groups, the number of downlink UE groups to which the UE belongs and a group index of each UE group, the number of uplink groups to which the UE belongs and a group index of each UE group, and a UE ID in each UE group to which the UE belongs. The following table shows a detailed embodiment of higher layer signaling when the BS allocates the C-RNTI with a specific rule.

TABLE 3

| Higher layer signaling information | The number of bits required to present information |
|---|---|
| C-RNTI start point | 16 bits |
| The number K of UEs available in corresponding RBG | [$\log_2 k_{max}$] ($k_{max}$: the maximum number of UE) |
| The number M of downlink UE groups | [$\log_2 K$] |
| The number N of uplink UE groups | [$\log_2 K$] |
| The number of downlink UE groups to which UE belongs | [$\log_2 M$] |
| Index of downlink UE group to which UE belongs | The number of downlink UE groups to which UE belongs' × [$\log_2 M$] or M bits (when expressed in bitmap) |
| UE ID in downlink UE group | 'The number of downlink UE groups to which UE belongs' × [$\log_2 K/M$] |
| The number of uplink UE groups to which UE belongs | [$\log_2 N$] |
| Index of uplink UE group to which UE belongs | 'The number of uplink UE groups to which UE belongs' × [$\log_2 N$] or N bits (when expressed in bitmap) |
| UE ID in uplink UE group | 'The number of downlink UE groups to which UE belongs' × [$\log_2 K/N$] |

In addition, as another example in which the BS allocates the C-RNTI with the specific rule, instead of using all combinations between a downlink UE group and an uplink UE group, only one part thereof may be used. For example, this is a case of using the combination only in a case where a value of adding the number of UEs in two UE groups is constant when the downlink UE group and the uplink UE group are combined to constantly maintain a control information length of a sPDCCH. This corresponds to the aforementioned method (2) used in the combination of UE groups capable of transmitting control information in the designated control signal length.

Figure 15:
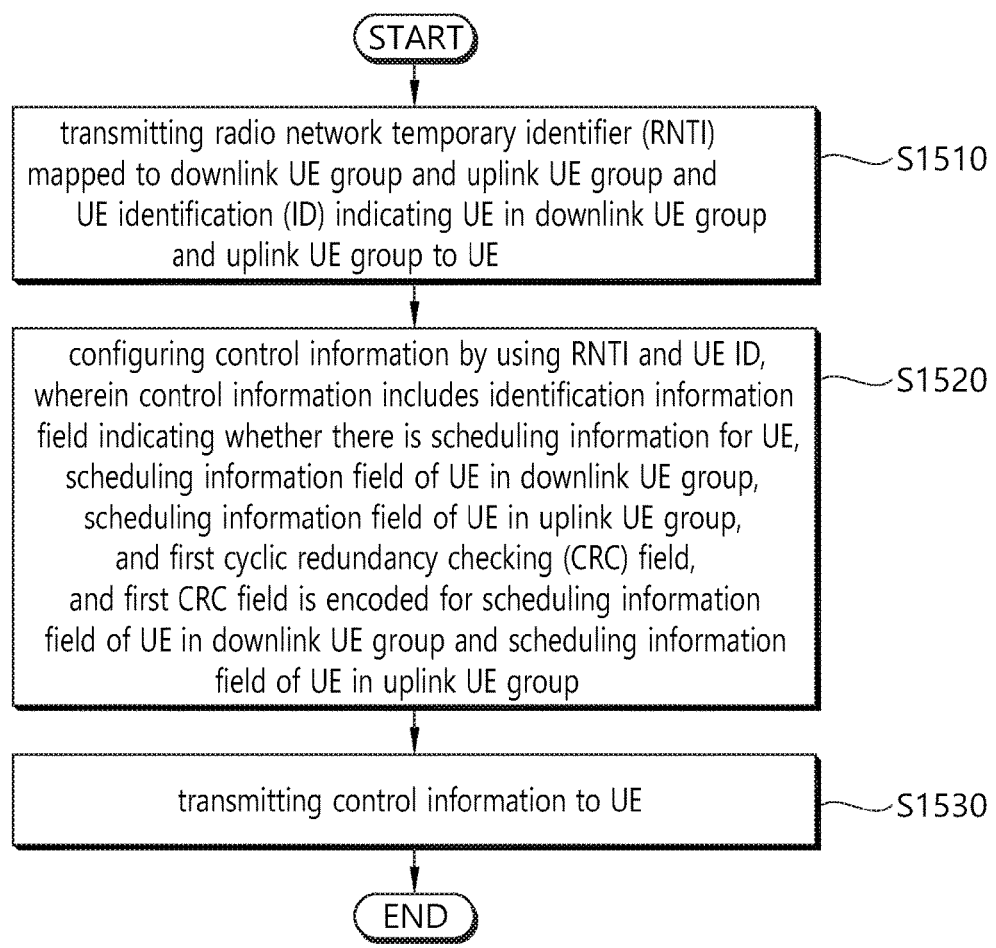
FIG. 15 is a flowchart showing a procedure of transmitting control information in a wireless communication system according to an embodiment of the present specification.

FIG. 15 is a flowchart showing a procedure of transmitting control information in a wireless communication system according to an embodiment of the present specification.

First, terminologies are summarized. Control information corresponds to a DCI format of a PDCCH or a sPDCCH, and scheduling information is included in the control information. An RNTI corresponds to a C-RNTI. Encoding corresponds to a coding process, and decoding corresponds to a decoding process. A downlink UE group is a group of UEs performing downlink transmission. An uplink UE group is a group of UEs performing uplink transmission. A procedure of transmitting the control information is performed by a BS.

First, in step S1510, the RNTI mapped to the downlink UE group and the uplink UE group and a UE ID indicating a UE in the downlink UE group and the uplink UE group are transmitted to the UE.

The RNTI is not a UE specific identifier but an identifier for all combinations of the downlink UE group and uplink UE group to which the UE belongs. That is, the UE in the downlink UE group and the UE in the uplink UE group commonly use a specific RNTI. Accordingly, control information of the downlink UE group and control information of the uplink UE group may be transmitted through one PDCCH or sPDCCH.

The UE ID may be used to determine where control information thereof is located in the control information of the downlink UE group or the control information of the uplink UE group.

In step S1520, the RNTI and the UE ID are used to configure the control information. That is, this is a step in which the BS configures a DCI format. The control information includes an identification information field indicating whether there is scheduling information for the UE, a scheduling information field of the UE in the downlink UE group, a scheduling information field of the UE in the uplink UE group, and a first CRC field.

It is regarded in the present specification that the identification information field corresponds to an information bit indicating whether there is scheduling information for each UE in the downlink/uplink UE group. Herein, however, it may be information indicating whether there is scheduling information for the UE.

The first CRC field is encoded for the scheduling information field of the UE in the downlink UE group and the scheduling information field of the UE in the uplink UE group. If a length of the scheduling information field of the UE in each UE group is constant irrespective of whether there is scheduling information for the UE, the first CRC field may be encoded for the identification information field and the scheduling information field of the UE in each UE group. That is, the first CRC field is commonly used for the scheduling information field of the UE in the downlink UE group and the scheduling information field of the UE in the uplink UE group. If a length of the scheduling information field of the UE in each UE group is changed according to whether there is scheduling information of the UE, a second CRC field may be added in the control information. In this case, the second CRC field may be encoded only for the identification information field, and the first CRC field may be encoded only for the scheduling information field of the UE in each UE group. The first CRC field or the second CRC field is masked by using an RNTI mapped to a combination of respective UE groups.

In step S1530, the control information configured in step S1520 is transmitted to the UE.

Figure 16:
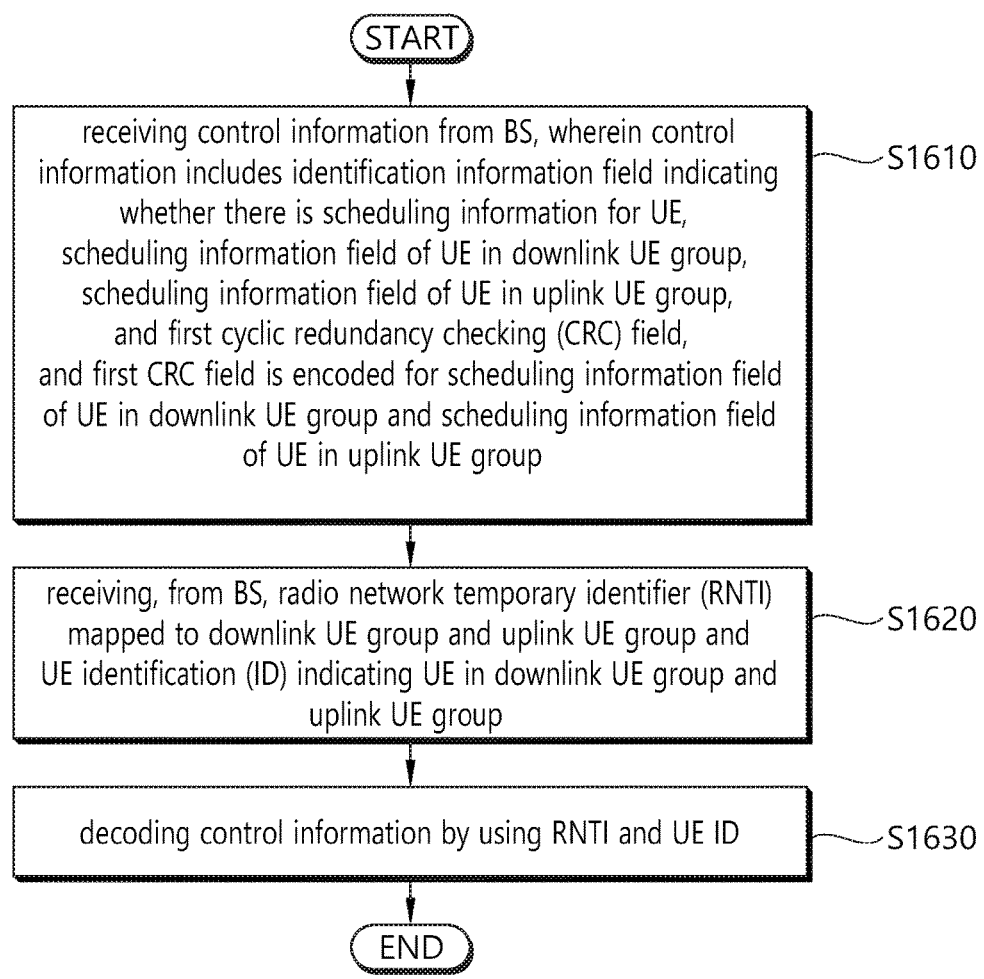
FIG. 16 is a flowchart showing a procedure of decoding control information in a wireless communication system according to an embodiment of the present specification.

FIG. 16 is a flowchart showing a procedure of decoding control information in a wireless communication system according to an embodiment of the present specification.

First, terminologies are summarized. Control information corresponds to a DCI format of a PDCCH or a sPDCCH, and scheduling information is included in the control information. An RNTI corresponds to a C-RNTI. Encoding corresponds to a coding process, and decoding corresponds to a decoding process. A downlink UE group is a group of UEs performing downlink transmission. An uplink UE group is a group of UEs performing uplink transmission. A procedure of decoding the control information is performed by a UE.

First, in step S1610, the control information is received from a BS. That is, this is a step in which the UE receives a DCI format configured by the BS. The control information includes an identification information field indicating whether there is scheduling information for the UE, a scheduling information field of the UE in the downlink UE group, a scheduling information field of the UE in the uplink UE group, and a first CRC field.

It is regarded in the present specification that the identification information field corresponds to an information bit indicating whether there is scheduling information for each UE in the downlink/uplink UE group. Herein, however, it may be information indicating whether there is scheduling information for the UE.

The first CRC field is encoded for the scheduling information field of the UE in the downlink UE group and the scheduling information field of the UE in the uplink UE group. If a length of the scheduling information field of the UE in each UE group is constant irrespective of whether there is scheduling information for the UE, the first CRC field may be encoded for the identification information field and the scheduling information field of the UE in each UE group. That is, the first CRC field is commonly used for the scheduling information field of the UE in the downlink UE group and the scheduling information field of the UE in the uplink UE group. If a length of the scheduling information field of the UE in each UE group is changed according to whether there is scheduling information of the UE, a second CRC field may be added in the control information. In this case, the second CRC field may be encoded only for the identification information field, and the first CRC field may be encoded only for the scheduling information field of the UE in each UE group. The first CRC field or the second CRC field is masked by using an RNTI mapped to a combination of respective UE groups.

In step S1620, the RNTI mapped to the downlink UE group and the uplink UE group and a UE ID indicating the UE in the downlink UE group and the uplink UE group are received from the BS.

The RNTI is not a UE specific identifier but an identifier for all combinations of the downlink UE group and uplink UE group to which the UE belongs. That is, the UE in the downlink UE group and the UE in the uplink UE group commonly use a specific RNTI. Accordingly, control information of the downlink UE group and control information of the uplink UE group may be transmitted through one PDCCH or sPDCCH.

The UE ID may be used to determine where control information thereof is located in the control information of the downlink UE group or the control information of the uplink UE group.

In step S1630, the control information is decoded by using the RNTI and the UE ID. That is, the UE may perform decoding by using the RNTI for CRC checking in the control information and by using the UE ID to discover its control information.

Figure 17:
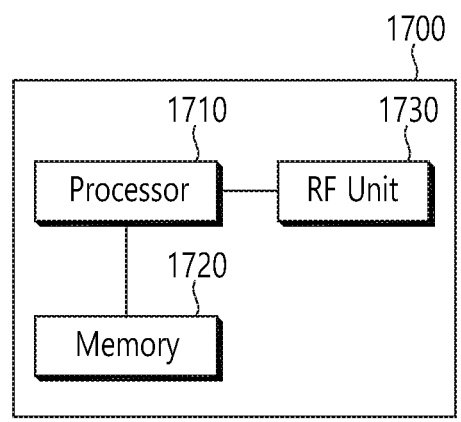
FIG. 17 is a block diagram showing an apparatus for wireless communication for implementing an embodiment of the present invention.

FIG. 17 is a block diagram showing an apparatus for wireless communication for implementing an embodiment of the present invention.

An apparatus 1700 for wireless communication includes a processor 1710, a memory 1720 and a radio frequency (RF) unit 1730.

The processor 1710 may be configured to implement proposed functions, procedures and/or methods described in this description. Layers of the radio interface protocol may be implemented in the processor 1710. The processor 1710 may handle a procedure explained above. The memory 1720 is operatively coupled with the processor 1710, and the RF unit 1730 is operatively coupled with the processor 1710.

The processor 1710 may include application-specific integrated circuit (ASIC), other chipset, logic circuit and/or data processing device. The memory 1720 may include read-only memory (ROM), random access memory (RAM), flash memory, memory card, storage medium and/or other storage device. The RF unit 1730 may include baseband circuitry to process radio frequency signals. When the embodiments are implemented in software, the techniques described herein can be implemented with modules (e.g., procedures, functions, and so on) that perform the functions described herein. The modules can be stored in memory 1720 and executed by processor 1710. The memory 1720 can be implemented within the processor 1710 or external to the processor 1710 in which case those can be communicatively coupled to the processor 1710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method of transmitting control information by a base station in a wireless communication system, the method comprising:
   transmitting, to a user equipment (UE), a radio network temporary identifier (RNTI) to which a downlink UE group and an uplink UE group are mapped in common and a UE identification (ID) for the UE;
   configuring the control information based on the RNTI and the UE ID,
   wherein the control information comprises an identification information field, a downlink information field, a uplink information field, a first cyclic redundancy checking (CRC) field and a second CRC field; and
   transmitting the control information to the UE,
   wherein the identification information field includes first information that there is first scheduling information for a first UE included in the downlink UE group and second information that there is second scheduling information for a second UE included in the uplink UE group,
   wherein the UE is included in the first UE or the second UE,
   wherein the downlink information field includes the first scheduling information for the first UE,
   wherein the uplink information field includes the second scheduling information for the second UE,
   wherein the first CRC field is encoded for the identification information field, and
   wherein the second CRC field is encoded for the downlink information field and the uplink information field.

2. The method of claim 1,
   wherein the downlink UE group is a group of UEs performing downlink transmission, and the uplink UE group is a group of UEs performing uplink transmission, and
   wherein the first UE and the second UE commonly use the RNTI.

3. The method of claim 1, wherein the first CRC field and the second CRC field are masked based on the RNTI.

4. The method of claim 1, wherein the second CRC field is commonly used for the downlink information field of UEs in the downlink UE group and the uplink information field of UEs in the uplink UE group.

5. The method of claim 1, wherein the number of UEs in the downlink UE group is a first constant value, and the number of UEs in the uplink UE group is a second constant value.

6. The method of claim 5, wherein, if there is no UE in the downlink UE group, the downlink information field is subjected to zero padding by the first constant value, and if there is no UE in the uplink UE group, the uplink information field is subjected to the zero padding by the second constant value.

7. The method of claim 1, wherein a sum of the number of UEs in the downlink UE group and the number of UEs in the uplink UE group is constant.

8. The method of claim 1, wherein the RNTI, the UE ID, an index of a downlink UE group to which the UE belongs, and an index of an uplink UE group to which the UE belongs are transmitted through radio resource control (RRC).

9. The method of claim 1, wherein the control information is transmitted through a physical downlink control channel (PDCCH) or a short PDCCH (sPDCCH).

10. A method of decoding control information by a user equipment (UE) in a wireless communication system, the method comprising:
    receiving control information from a base station,
    wherein the control information comprises an identification information field, a downlink information field, a uplink information field, a first cyclic redundancy checking (CRC) field and a second CRC field;
    receiving, from the base station, a radio network temporary identifier (RNTI) to which a downlink UE group and an uplink UE group are mapped in common and a UE identification (ID) for the UE; and
    decoding the control information based on the RNTI and the UE ID,
    wherein the identification information field includes first information that there is first scheduling information for a first UE included in the downlink UE group and second information that there is second scheduling information for a second UE included in the uplink UE group,
    wherein the UE is included in the first UE or the second UE,
    wherein the downlink information field includes the first scheduling information for the first UE,
    wherein the uplink information field includes the second scheduling information for the second UE,
    wherein the first CRC field is encoded for the identification information field, and
    wherein the second CRC field is encoded for the downlink information field and the uplink information field.

11. The method of claim 10, wherein the RNTI, the UE ID, an index of a downlink UE group to which the UE belongs, and an index of an uplink UE group to which the UE belongs are received through radio resource control (RRC).

12. A base station for transmitting control information in a wireless communication system, the base station comprising:
    a radio frequency (RF) unit that transmits and receives a radio signal; and
    a processor operatively coupled to the RF unit, wherein the processor is configured to:
        transmit, to a user equipment (UE), a radio network temporary identifier (RNTI) to which a downlink UE group and an uplink UE group are mapped in common and a UE identification (ID) for the UE;

configure the control information based on the RNTI and the UE ID, wherein the control information comprises an identification information field, a downlink information field, a uplink information field, a first cyclic redundancy checking (CRC) field and a second CRC field; and transmit the control information to the UE, wherein the identification information field includes first information that there is first scheduling information for a first UE included in the downlink UE group and second information that there is second scheduling information for a second UE included in the uplink UE group, wherein the UE is included in the first UE or the second UE, wherein the downlink information field includes the first scheduling information for the first UE, wherein the uplink information field includes the second scheduling information for the second UE, wherein the first CRC field is encoded for the identification information field, and wherein the second CRC field is encoded for the downlink information field and the uplink information field.

* * * * *